(12) United States Patent
Hiller et al.

(10) Patent No.: US 8,766,480 B2
(45) Date of Patent: Jul. 1, 2014

(54) WIND FARM HAVING A PLURALITY OF WIND ENERGY INSTALLATIONS

(75) Inventors: Marc Hiller, Lauf an der Pegnitz (DE); Norbert Klaassen, Erlangen (DE); Theodor Salzmann, Marloffstein (DE); Rainer Sommer, Heroldsbach (DE)

(73) Assignee: Siemens Aktiengesellschaft, München (DE)

( * ) Notice: Subject to any disclaimer, the term of this patent is extended or adjusted under 35 U.S.C. 154(b) by 845 days.

(21) Appl. No.: 12/991,240

(22) PCT Filed: Mar. 26, 2009

(86) PCT No.: PCT/EP2009/053616
§ 371 (c)(1),
(2), (4) Date: Nov. 5, 2010

(87) PCT Pub. No.: WO2009/135728
PCT Pub. Date: Nov. 12, 2009

(65) Prior Publication Data
US 2011/0049994 A1    Mar. 3, 2011

(30) Foreign Application Priority Data
May 7, 2008    (DE) .......................... 10 2008 022 617

(51) Int. Cl.
*H02J 1/00*    (2006.01)
*H02J 3/00*    (2006.01)
(52) U.S. Cl.
USPC .......................................................... 307/82
(58) Field of Classification Search
USPC ............................................. 307/82; 290/44
See application file for complete search history.

(56) References Cited

FOREIGN PATENT DOCUMENTS

| DE | 196 20 906 A1 | 1/1998 |
|---|---|---|
| RU | 2221165 C2 | 1/2004 |
| WO | WO 97/45908 A1 | 12/1997 |
| WO | WO 01/52379 A2 | 7/2001 |
| WO | WO 0152379 A2 | 7/2001 |
| WO | WO 03/025390 A1 | 3/2003 |
| WO | WO 2005/114830 A1 | 12/2005 |

OTHER PUBLICATIONS

R. Marquardt, A. Lesnicar, J. HildingeETG-Tagung 2002; Book; 2002.
Björn Andresen, Jens Birk EPE 2007 Aalborg; Others; 2007.
Internetseite www.abb.com/powerelectronics; Others; Aug. 30, 2007.
Internetseite www.abb.com/hvdc; Others; Mar. 23, 2005.
Lena Max, Torbjörn Thiringer EPE 2007 Aalborg; Book; 2007.

*Primary Examiner* — Carlos Amaya
(74) *Attorney, Agent, or Firm* — Henry M Feiereisen LLC

(57) ABSTRACT

The invention relates to a wind power plant (4) which consists of a nacelle (12) arranged on a tower (14), a rotor (28), a generator (16), a power converter (20) on the generator side, a power converter (22) on the network side and a transformer (26), the two power converters (20, 22) being electrically connected to each other on the DC voltage side, and the power converter (22) on the network side being connected on the AC voltage side to a feeding point (8) of a destination network (6) by means of the transformer (26). Every phase module (74) of the power converter (22) on the network side has an upper and lower valve branch (T1, T3, T5; T2, T4, T6) having at least two bipolar subsystems (76) that are connected in series and the power converter (20) on the generator side and the power converter (22) on the network side are interconnected on the DC side by means of a DC cable (72). A corresponding wind farm (2) consists of a plurality of wind power stations (4) and has a flexible design as compared to known DC concepts, the nacelles (12) of every wind power station (4) having a low dead weight.

16 Claims, 8 Drawing Sheets

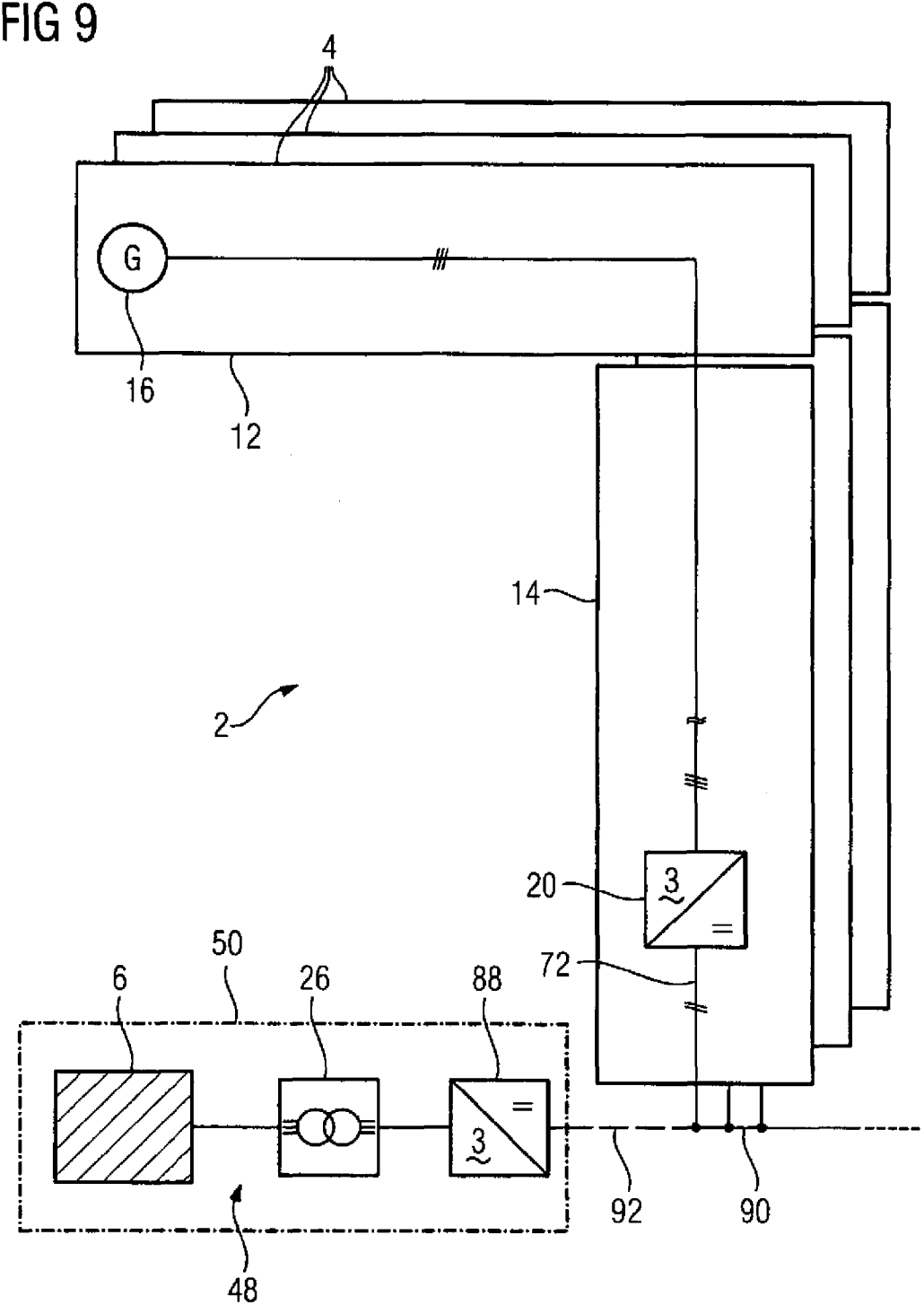

WIND FARM HAVING A PLURALITY OF WIND ENERGY INSTALLATIONS

CROSS-REFERENCES TO RELATED APPLICATIONS

This application is the U.S. National Stage of International Application No. PCT/EP2009/053616, filed Mar. 26, 2009, which designated the United States and has been published as International Publication No. WO 2009/135728 and which claims the priority of German Patent Application, Serial No. 10 2008 022 617.3, filed May 7, 2008, pursuant to 35 U.S.C. 119(a)-(d).

BACKGROUND OF THE INVENTION

The invention relates to a wind energy installation and to a wind farm which consists of these wind energy installations.

Electrical energy which is produced using wind as the stochastic primary energy source by means of wind energy installations in a wind farm is intended to be fed into a regional supply grid.

One known concept for a wind farm 2 is illustrated schematically in FIG. 1 of DE 196 20 906 A1. This known concept is a decentralized polyphase concept, because the energy from each wind energy installation 4 in the wind farm 2 is fed into a regional supply grid 6. Since the increase in the voltage at a wind farm feed point 8 of the regional supply grid 6 must not be more than 4%, this results in a maximum possible wind power, depending on the distance between the wind farm feed point 8 and a substation for this supply grid 6. The illustrated wind farm 2 has three wind energy installations 4, which each have a pod 12 and a tower 14. The pod 12 is arranged on the tower 14 such that it can rotate and has a generator 16, a generator-side filter 18, a generator-side converter 20, a grid-side converter 22, a grid-side filter 24 and a transformer 26. The two converters 20 and 22 are electrically conductively connected to one another on the DC voltage side by means of a DC-link circuit. These two converters 20 and 22 and the DC-link circuit therefore form a DC-link converter.

One design of a DC-link converter such as this arranged in a pod 12 of a wind energy installation 4 is disclosed in the publication entitled "A high power density converter system for the Gamesa G10×4.5 MW Wind turbine" by Björn Andresen and Jens Birk, published in the Proceedings of EPE 2007 in Aalborg. In this DC-link converter, which is described in this publication, the two converters 20 and 22 are in the form of self-commutated pulse-controlled converters. In order to make it possible to keep harmonics produced by the converters 20 and 22, respectively, away from the generator 16 and the supply grid 6, respectively, respective filters 18 and 24 are provided on the generator side and on the grid side. A converter output voltage which is generated is matched to a rated voltage of the regional supply grid by means of the grid-side transformer 26.

As can be seen from the cited publication, the generator 16 is linked directly or by means of a gearbox on the rotor side to a rotor of the wind energy installation 4. If a synchronous generator is used as the generator 16, there is no need for the gearbox, thus reducing the weight of the pod 12. The rotors are not illustrated in this FIG. 1, for clarity reasons.

FIG. 2 shows a second embodiment of the polyphase concept of a wind farm 2. This embodiment differs from the embodiment shown in FIG. 1 in that the electrical equipment in a wind energy installation 4 is no longer arranged in the pod 12 but in the tower 14. An embodiment such as this of a wind energy installation 4 is disclosed in the publication entitled "ABB Advanced Power Electronics—MV full power wind converter for Multibrid M5000 turbine", published on the Internet, on the site www.abb.com/powerelectronics. The installation parts 18, 20, 22, 24 and 26 are arranged in the foot area of the tower 14 of a wind energy installation 4. Only the generator 16 therefore still remains in the pod 12 of each wind energy installation 4 in a wind farm 2.

DE 196 20 906 A1 discloses a wind farm 2 having n wind energy installations 4. In this known wind farm 2, each wind energy installation 4 has a rotor 28, whose rotor blades are variable, a synchronous generator 30, a rectifier 32 and a smoothing inductor 34. The synchronous generator 30 is coupled directly to the rotor 28 and has two stator windings, which are electrically offset through 30° with respect to one another and are each electrically conductively connected to a partial rectifier 36 of the rectifier 32. The synchronous generator 30 may have permanent-magnet excitation or voltage-regulated excitation. The rectifier 32 is a multi-pulse design, for example a 12-pulse design. By way of example, the smoothing inductor 34 is arranged in a positive output line 38. This positive output line 38 and a negative output line 40 can respectively be disconnected from a positive and negative busbar 44 and 46 by means of a circuit breaker 42. The n wind energy installations in the wind farm 2 are connected in parallel on the direct-current side by means of these two busbars 44 and 46.

A grid-side converter station 48 in this illustration of a direct-current concept of the wind farm 2 is arranged directly adjacent to a substation 50 of a regional supply grid 6. This grid-side converter station 48 has a smoothing inductor 52, an inverter 54, a matching transformer 56 and a filter 58. In the same way as the rectifier 32 in each wind energy installation 4, the inverter 54 consists of two partial inverters 60. The number of pulses in the inverter 54 corresponds to the number of pulses in the rectifier 32. Each partial inverter 60 is electrically conductively connected on the AC voltage side to a secondary winding of the matching transformer 56, whose primary winding is electrically conductively connected to a busbar 62 in the substation 50. The filter 58 is likewise connected to this busbar 62. By way of example, the smoothing inductor 52 is arranged in a positive input line 64 to the inverter 54. The positive input line 64 and a negative input line 66 are electrically inductively connected to the positive and negative busbars 44 and 46 in the wind energy installations 4, which are electrically connected in parallel, by means of a direct-current transmission device 68. The direct-current transmission device 68 may on the one hand be two direct-current lines or one direct-current cable.

Thyristors are provided as the converter valves for the rectifiers 32 for each wind energy installation 4 and the inverter 54 in the grid-side converter station 48. The rectifiers 32 regulate a power, and the polyphase voltage is regulated by means of the inverter 54. This interconnection of n converter stations corresponds to an HVDC multipoint grid.

The publication entitled "Offen für Offshore—HVDC Light—Baustein einer nachhaltigen elektrischen Energieversorgung" [Open for Offshore HVDC Light—Module for sustainable electrical power supply] discloses an offshore wind farm in which a direct-current cable is used instead of a polyphase cable. A power converter is provided at each of the two ends of this direct-current cable, and these converters are each provided with a power transformer on the AC voltage side. IGBT converters are provided as the power converters, as known from a DC-link converter for medium voltage. The DC-link capacitor is split in two, and DC voltage connections of each IGBT converter are each electrically connected in parallel. One wind energy installation in this wind farm in each case has a generator-side IGBT converter whose grid-side IGBT converters are integrated in an IGBT converter of a grid-side converter station. The IGBT converters of the wind energy installations in this wind farm are connected on the DC voltage side by means of a direct-current cable to the IGBT converter in the grid-side converter station. This direct-current concept allows the wind energy installations in a wind farm, in particular in an offshore wind farm, to be more than 140 km away from a grid-side converter station.

The publication entitled "Control method and snubber selection for a 5MW wind turbine single active bridge DC/DC converter" by Lena Max and Torbjörn Thiringer, printed in the Conference Proceedings for EPE 2007 in Aalborg, discloses a further embodiment of a DC voltage concept for a wind farm. In this embodiment, each wind energy installation has a generator, a generator-side converter and a DC voltage converter. A plurality of wind energy installations are linked by means of a further DC voltage converter to a DC voltage converter which is connected by means of a direct-current cable to a grid-side inverter at a wind farm feed point to a regional supply grid. Either a diode rectifier or a self-commutated IGBT converter is provided as the generator-side converter for each wind energy installation.

The invention is now based on the object of improving a wind energy installation and a wind farm consisting of these wind energy installations in such a way that it is possible to save installation parts.

According to the invention, this object is achieved by the characterizing features of claim 1 and claim 8, respectively.

SUMMARY OF THE INVENTION

According to one aspect of the invention, a wind energy installation includes a pod arranged on a tower, wherein the pod has a rotor, a generator operatively connected to the rotor, a converter electrically connected on an AC voltage side to the generator, and an inverter electrically connected on a DC voltage side to a DC voltage side of the converter by means of a direct-current cable. An AC voltage side of the inverter is connected via a transformer to a feed point of an energy-receiving grid. The inverter includes phase modules, with each phase module having an upper and a lower valve branch, wherein each valve branch has at least two two-pole subsystems electrically connected in series.

A further advantage of this converter with distributed energy stores is that each valve branch in this converter can have redundant two-pole subsystems. Operation can therefore be maintained without any restriction if any two-pole subsystems become faulty, thus improving the availability of the wind energy installation. Since a converter with distributed energy stores is provided as the load-side converter for a DC-link converter, the DC-link circuit of this DC-link converter no longer has an energy store. In consequence, this DC-link circuit need no longer be designed to have a low inductance, thus making it possible to use a direct-current cable as the connection on the DC voltage side of the generator-side converter to the grid-side converter in a wind-energy installation. In addition, an DC-link short-circuit is highly improbable in comparison to a DC-link converter with an energy store in the DC-link circuit, thus making it possible to ensure a safe response in the event of a fault. Furthermore, the converter valves in the generator-side converter in the DC-link converter for the wind energy installation need no longer be designed for a short-circuit current caused by a low-impedance DC-link short-circuit. This makes it possible to considerably reduce the $i^2 t$ requirement for these converter valves.

If a wind farm is formed from a multiplicity of wind energy installations according to the invention, then the grid-side converters with distributed energy stores in each wind energy installation are combined in one converter with distributed energy stores in a grid-side converter station, in which case this grid-side converter station is advantageously arranged directly adjacent to a wind farm feed point. Each wind energy installation in the wind farm according to the invention therefore now has only one generator with a downstream converter, in which case, advantageously, this generator-side converter is arranged in the foot area of a tower of each wind energy installation. This considerably reduces the weight of each pod of the wind energy installation in the wind farm according to the invention. This furthermore simplifies the design of a tower of each wind energy installation in this wind farm.

In one advantageous embodiment of the wind energy installations according to the invention, a converter with distributed energy stores is also provided as the generator-side converter. The use of a converter with distributed energy stores on the generator side of the DC-link converter of the wind energy installation, in which a multiplicity of two-pole subsystems are used in each valve branch of the converter, makes it possible to use a generator with less stringent requirements on the winding insulation as the generator. The thinner insulation on the windings of the generator improves its cooling.

Further advantageous embodiments of the wind energy installation can be found in dependent claims 4 to 7, and further advantageous embodiments of the wind farm can be found in dependent claims 9 to 14.

BRIEF DESCRIPTION OF THE DRAWING

FIG. 9 shows a third embodiment of a wind energy installation according to the invention in this wind farm.

DETAILED DESCRIPTION OF PREFERRED EMBODIMENTS

Figure 1:
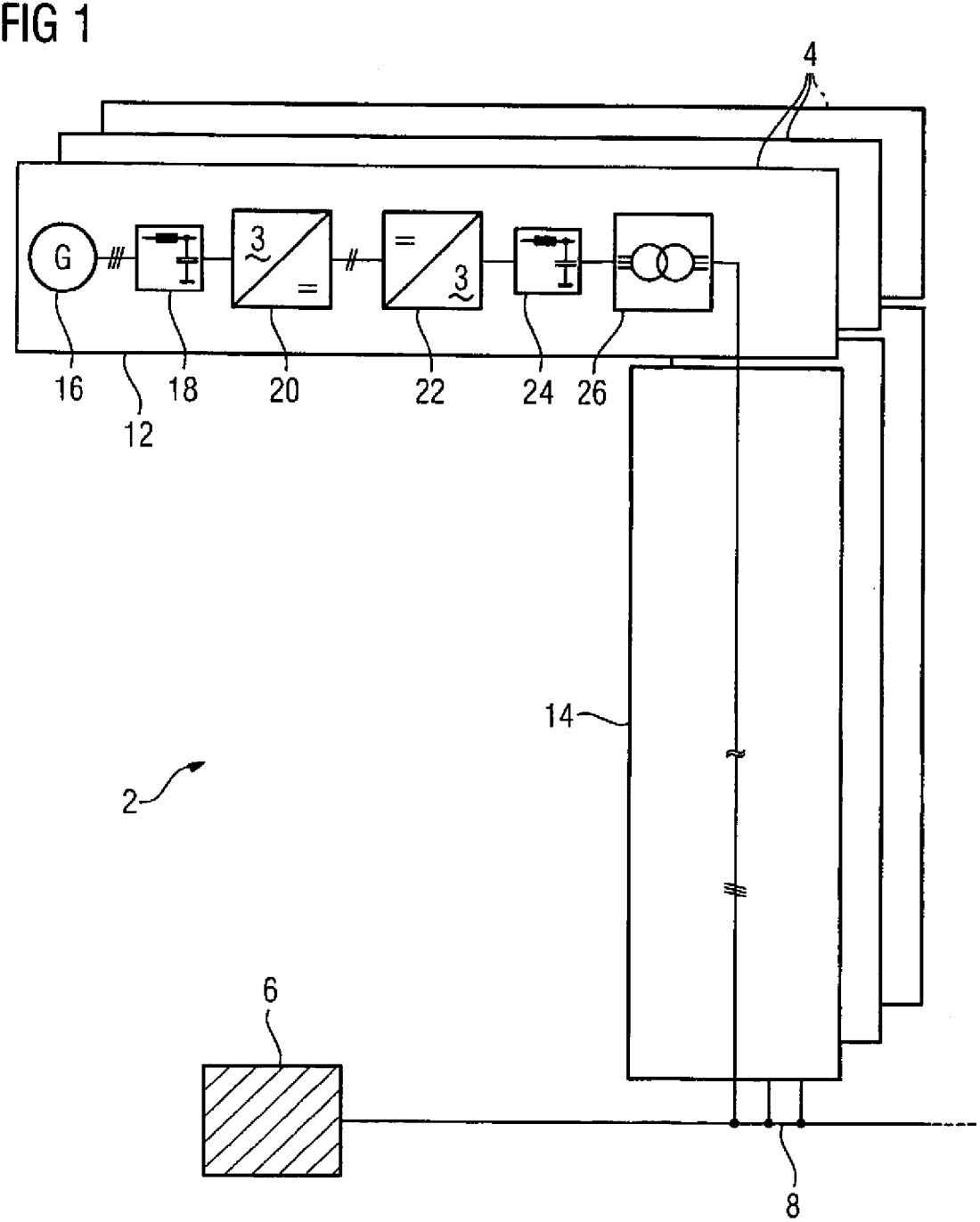
FIG. 1 shows a first embodiment of a known polyphase concept of a wind energy installation.
Figure 2:
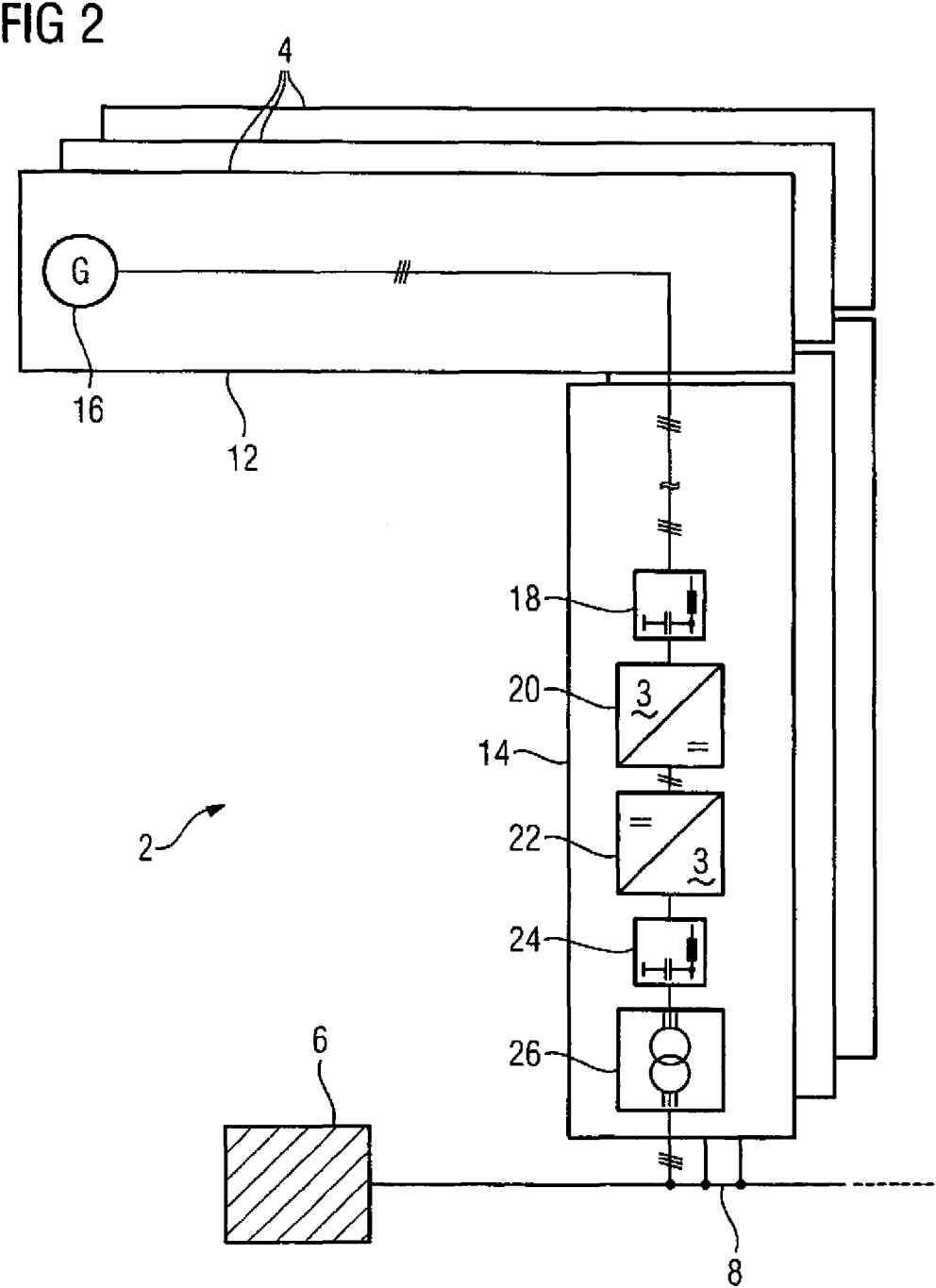
FIG. 2 shows a second embodiment of the known polyphase concept as illustrated in FIG. 1.
Figure 3:
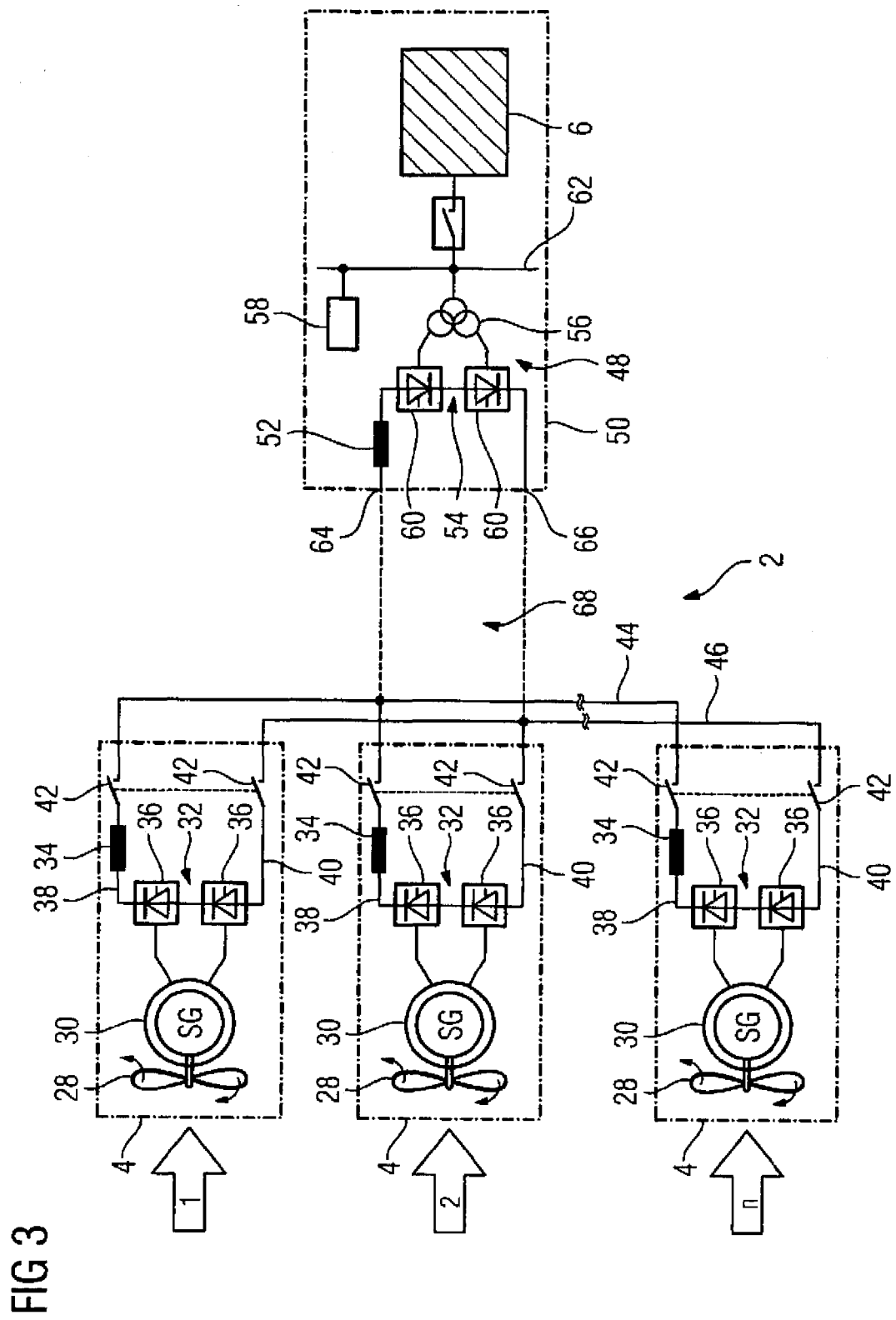
FIG. 3 shows one embodiment of a known direct-current concept for a wind farm.
Figure 4:
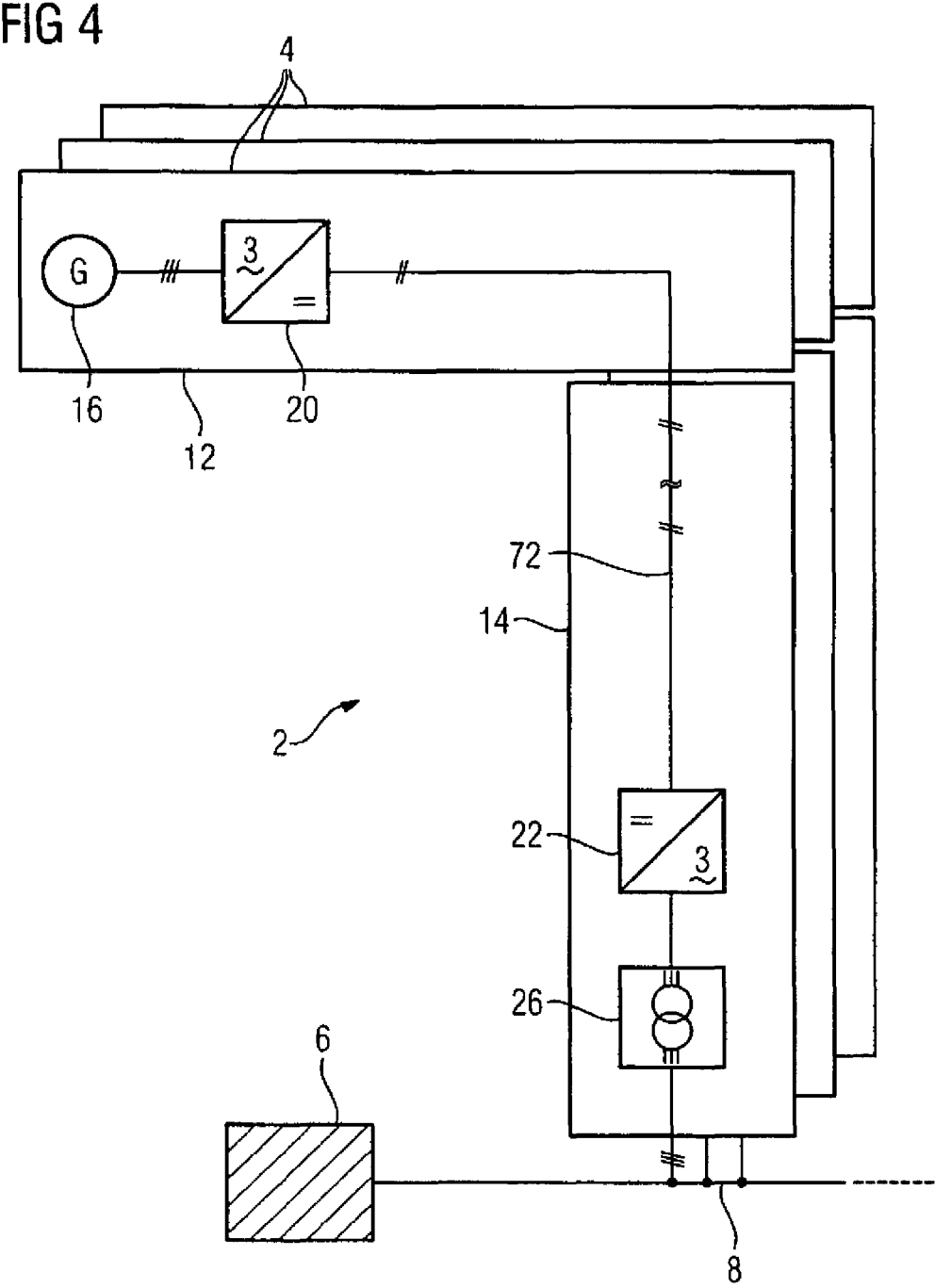
FIG. 4 shows a first embodiment of a wind energy installation according to the invention.

FIG. 4 illustrates in more detail a first embodiment of a wind energy installation 4 according to the invention in a wind farm 2. In this wind energy installation 4 according to the invention, only the generator 16 and the generator-side converter 20 are still arranged in the pod 12 of this wind energy installation 4. The grid-side converter 22 and the transformer 26 on the alternating current side, and which is also referred to as a matching transformer, are arranged in the associated tower 14 of this wind energy installation 4, on which the pod 12 is mounted such that it can rotate. In this case, these two installation parts 22 and 26 are arranged in the foot area of the tower 14. The wind energy installation 4 is connected by means of this transformer 26 to the wind farm feed point 8 of a regional supply grid 6. According to the invention, a converter 70 with distributed energy stores is provided as the grid-side converter 22. A circuit diagram of a converter 70 such as this is illustrated in more detail in FIG. 5. The use of a converter 70 with distributed energy stores at least as the grid-side converter 22 means that the DC-link circuit of the DC-link converter formed from generator-side and grid-side converters 20 and 22 no longer has an energy store in the form of capacitors, in particular electrolytic capacitors. For this reason, this DC-link circuit need no longer be designed to have a low inductance, as a result of which a direct-current cable 72 is provided as the link between the DC voltage sides of these two converters 20 and 22. In the simplest case, the generator-side converter 20 is a diode rectifier. The generator-side converter is advantageously in the form of four-quadrant converter.

If a converter 70 with distributed energy stores is likewise used as the generator-side converter 20, it is possible to use a generator 16 with less stringent requirements for the winding insulation. This improves the cooling of the windings of this generator 16. If this generator-side converter 20, when in the form of a converter 70 with distributed energy stores, has a large number of distributed energy stores, for example at least ten energy stores per valve branch of a phase module in this converter 70, then the generator-side filter 18 is no longer required. In addition, this makes it possible to achieve higher generator voltages, as a result of which the lines of the direct-current cable 72 in the tower 14 of each wind energy installation 4 can be designed for lower currents. This generator-side converter 70 with distributed energy stores can likewise have further redundant energy stores, leading to a higher availability of the wind energy installation 4.

Figure 5:
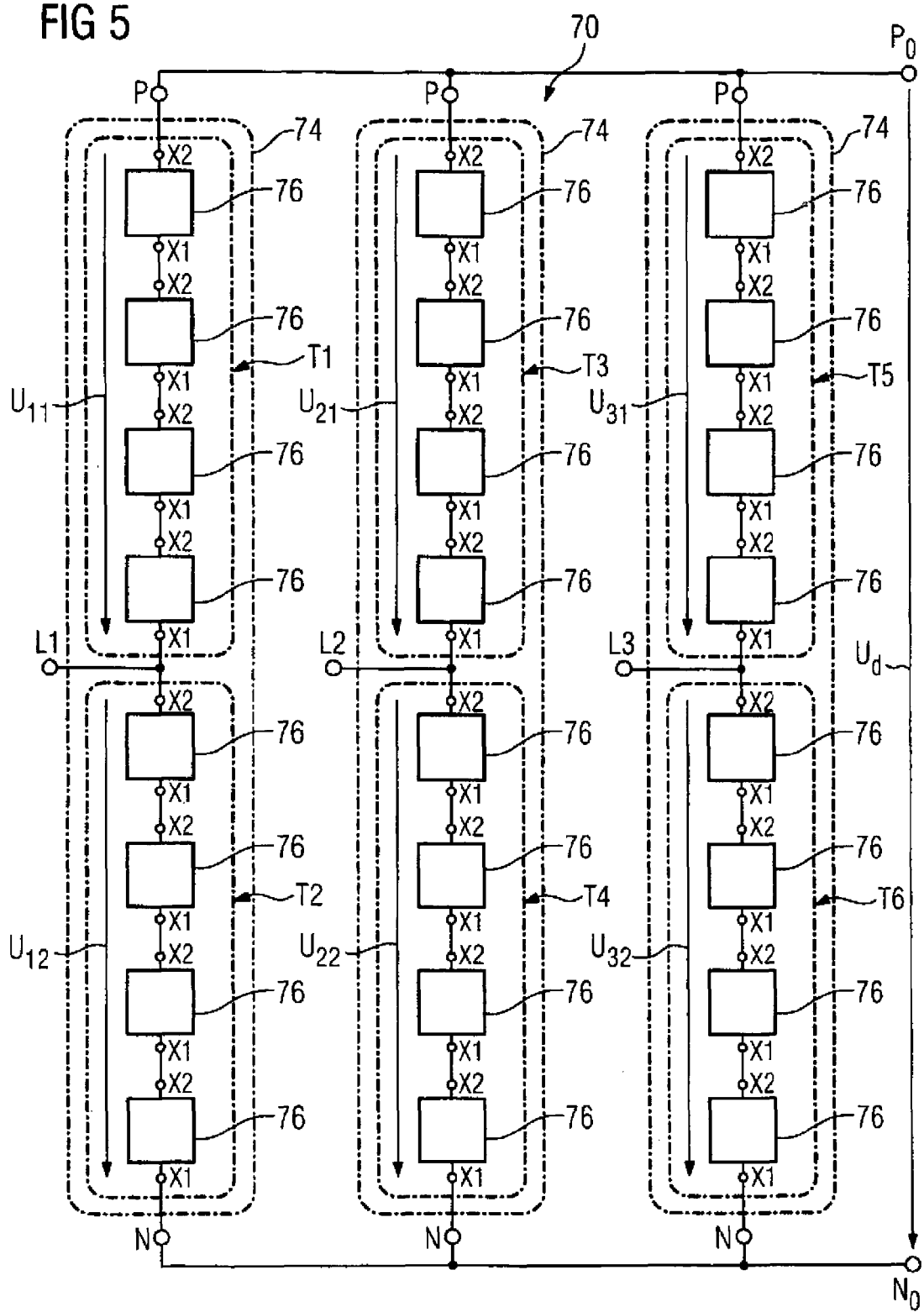
FIG. 5 shows a circuit diagram of a converter with distributed energy stores, FIG. 6, 7 each show one embodiment of a two-pole subsystem of the converter illustrated in FIG. 5.

FIG. 5 shows a circuit diagram of a converter 70 with distributed energy stores. This converter 70 has three phase modules 74, which are connected electrically in parallel on the DC voltage side. When these phase modules 74 are connected in parallel, a positive and a negative DC voltage busbar $P_0$ and $N_0$ are provided. There is a DC voltage $U_d$ between these two DC voltage busbars $P_0$ and $N_0$. The two lines of the direct-current cable 72 are connected to these DC voltage busbars $P_0$ and $N_0$ of this converter 70.

Figure 6:
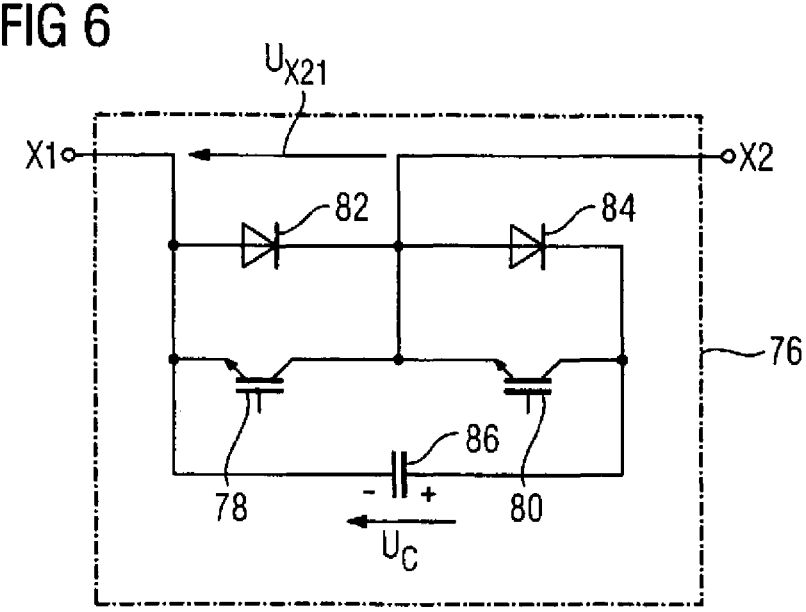

FIG. 6 shows a first embodiment of a two-pole subsystem 76. This two-pole subsystem 76 has two semiconductor switches 78 and 80 which can be turned off, two diodes 82 and 84 and a unipolar energy-storage capacitor 86. The two semiconductor switches 78 and 80 which can be turned off are electrically connected in series, with this series circuit being connected electrically in parallel with the energy-storage capacitor 86. Each semiconductor switch 78 and 80 which can be turned off is connected electrically in parallel with one of the two diodes 82 and 84, such that this diode is connected back-to-back in parallel with the corresponding semiconductor switch 78 and 80 which can be turned off. The unipolar energy-storage capacitor 84 in the two-pole subsystem 76 consists either of a capacitor or of a capacitor bank comprising a plurality of such capacitors, with a resultant capacitance $C_0$. The connecting point between the emitter of the semiconductor switch 78 which can be turned off and the anode of the diode 82 forms a first connecting terminal X1 of the subsystem 76. The connecting point between the two semiconductor switches 78 and 80 which can be turned off and the two diodes 82 and 84 forms a second connecting terminal X2 of the two-pole subsystem 76.

Figure 7:
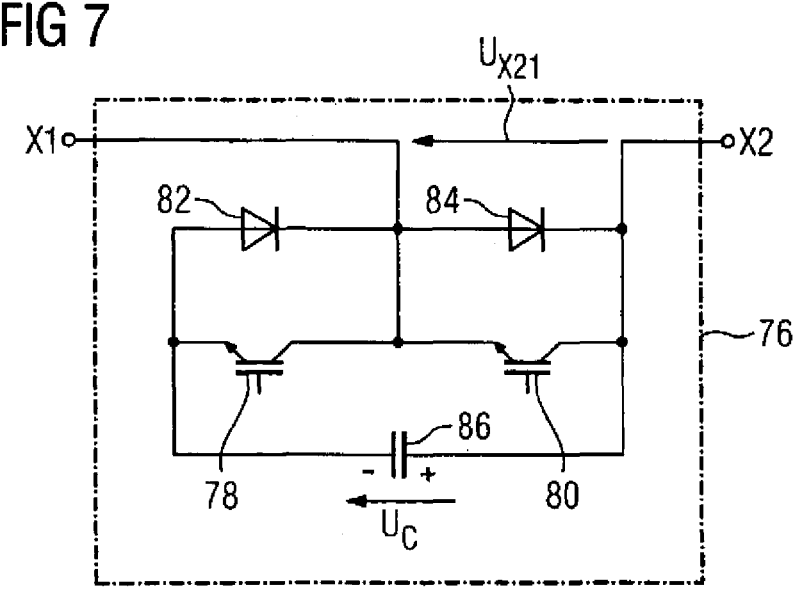

In the embodiment of the subsystem 76 as shown in FIG. 7, this connecting point forms the first connecting terminal X1. The connecting point between the drain of the semiconductor switch 80 which can be turned off and the cathode of the diode 84 forms the second connecting terminal X2 of the two-pole subsystem 76.

According to the publication entitled "Modulares Stromrichterkonzept für Netzkupplungsanwendung bei hohen Spannungen" [Modular converter concept for grid coupling use at high voltages] by Rainer Marquardt, Anton Lesnicar and Jürgen Hildinger, printed in the Proceedings of the ETG Conference 2002, the two-pole subsystem 76 may assume three switching states. In the switching state I, the semiconductor switch 78 which can be turned off is switched on, and the semi-conductor switch 80 which can be turned off is switched off. In this switching state I, the terminal voltage $U_{X21}$ of the two-pole subsystem 76 is equal to zero. In the switching state II, the semiconductor switch 78 which can be turned off is switched off, and the semiconductor switch 80 which can be turned off is switched on. In this switching state II, the terminal voltage $U_{X21}$ of the two-pole subsystem 76 is equal to the voltage $U_C$ across the energy-storage capacitor 86. During normal operation without faults, only these two switching states I and II are used. In the switching state III, both semiconductor switches 78 and 80 which can be turned off are switched off.

Figure 8:
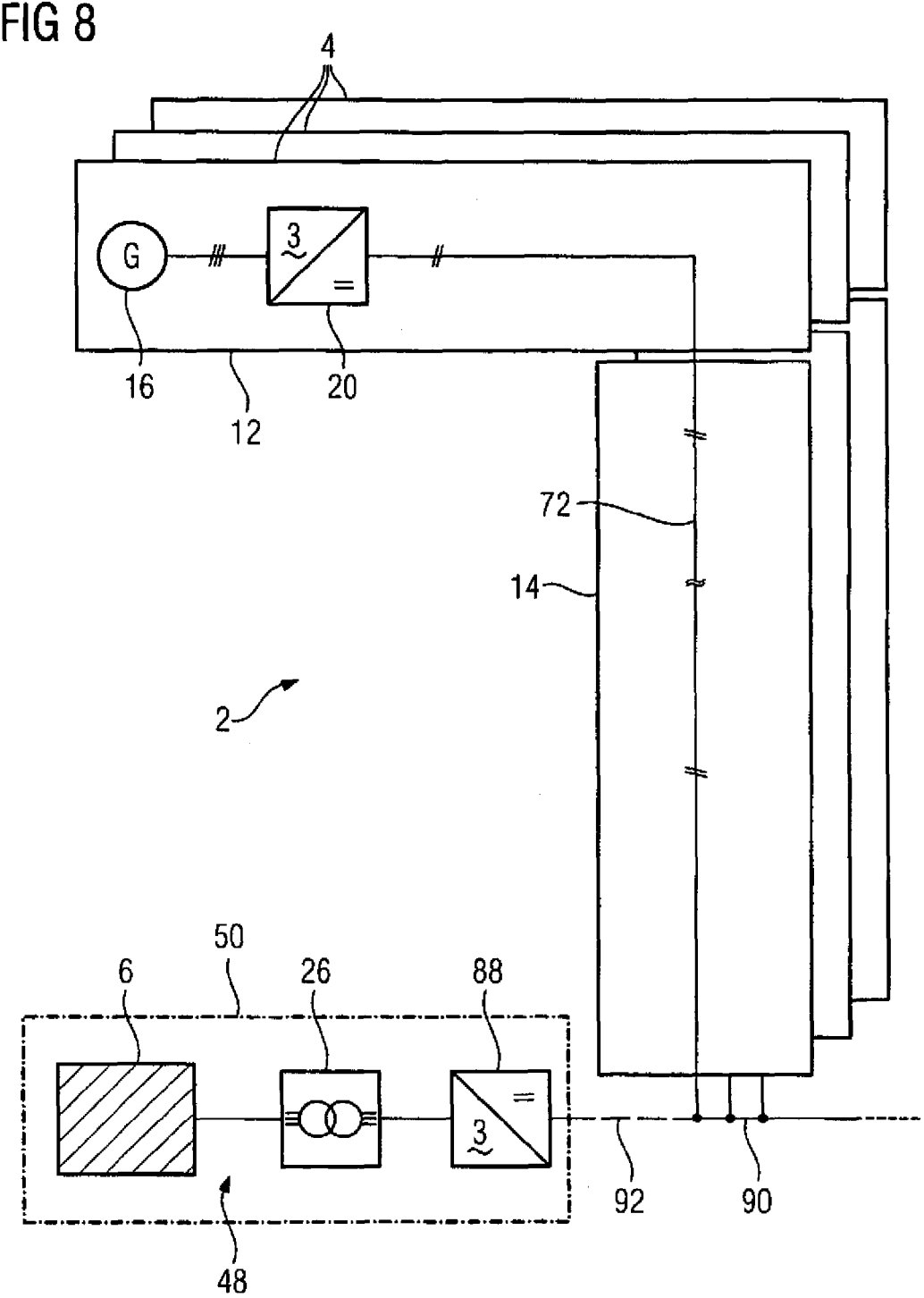
FIG. 8 shows a second embodiment of a wind energy installation according to the invention in a wind farm.

FIG. 8 shows in more detail a second embodiment of a wind energy installation 4 according to the invention in a wind farm 2. This embodiment differs from the first embodiment shown in FIG. 4 in that a grid-side converter 88 with a transformer 26 on the AC voltage side is provided for all the wind energy installations 4 in this wind farm 2, and is arranged in the grid-side converter station 48 in the substation 50 of a regional supply grid 6. This means that the grid-side converters 22 for the wind energy installations 4 in the wind farm 2 are combined in this grid-side converter 88 in the converter station 48. In consequence, the wind energy installations 4 in the wind farm 2 are no longer coupled on the AC voltage side to the wind farm feed point 8, but are coupled to the wind farm feed point 90 on the DC voltage side. Each direct-current cable 72 of each wind energy installation 4 is therefore linked by means of the wind farm feed point 90 to the grid-side converter station 48 by means of a further direct-current cable 92. This direct-current cable 92 may be several 100 km long. This means that the installation of a wind farm 2 is no longer dependent on the location of a grid feed point. The only critical factor is the wind conditions. In addition, an offshore wind farm can be linked by means of the direct-current cable 92 to a regional supply grid on land.

FIG. 9 shows in more detail a third embodiment of a wind energy installation 4 according to the invention in a wind farm 2. This third embodiment differs from the second embodiment shown in FIG. 8 in that the generator-side converter 20 in each wind energy installation 4 in this wind farm 2 has been moved from the pod 12 to the foot area of the associated tower 14. In consequence, the pod 12 of each wind energy installation 4 in the wind farm 2 now accommodates only the generator 16 and, if required a gearbox, which can likewise be dispensed with if a permanent-magnet synchronous generator is used as the generator 16. This considerably reduces the weight of the pod 12 of a wind energy installation 4. The reduction in the weight of the pod 12 likewise simplifies the structure of its tower 14, on which the pod 12 is mounted such that it can rotate. This reduces the costs of a wind energy installation 4, and therefore those of a wind farm 2 which is formed using these wind energy installations 4.

The use of a converter 70 with distributed energy stores in each case as the grid-side converter 22 for each wind energy installation 4, and also as the generator-side converter 20 for a wind energy installation 4 such as this or as the grid-side converter 88 for a grid-side converter station 48 in a wind farm 2 results in a direct-current concept whose design is more flexible than that of the known direct-current concepts, thus allowing this to be matched more easily to the requirements of the operators of a wind farm 2. Furthermore, the costs of a wind farm 2 such as this are considerably reduced. In addition, a longer distance can be provided between the wind farm 2 and a substation 50 of a regional supply grid 6, as a result of which the choice of an installation location for a wind farm 2 is dependent only on a stochastic wind distribution.

The invention claimed is:

1. A wind energy installation, comprising:
a pod arranged on a tower, the pod having
a rotor,
a generator operatively connected to the rotor,
a converter electrically connected on an AC voltage side to the generator, and
an inverter electrically connected on a DC voltage side to a DC voltage side of the converter by means of a direct-current cable in absence of a capacitor or inductor connected in the DC cable between the DC voltage side of the converter and the DC voltage side of the inverter, and on an AC voltage side via a transformer to a feed point of an energy-receiving grid, the inverter having phase modules, with each phase module having an upper and a lower valve branch, and with each valve branch having at least two two-pole subsystems electrically connected in series.

2. The wind energy installation of claim 1, wherein the converter comprises a diode rectifier.

3. The wind energy installation of claim 1, wherein the converter comprises phase modules, with each phase module having an upper and a lower valve branch, and with each valve branch having at least two two-pole subsystems electrically connected in series.

4. The wind energy installation of claim 3, wherein each two-pole subsystem of the converter comprises an energy-storage capacitor and two turn-off semiconductor switches which are electrically connected in series at a connecting point, with the series-connected semiconductor switches being electrically connected in parallel with the energy-storage capacitor, wherein the connecting point forms a first terminal of the two-pole subsystem and one pole of the energy-storage capacitor forms a second terminal of the two-pole subsystem.

5. The wind energy installation of claim 4, wherein the turn-off semiconductor switches comprise insulated gate bipolar transistors (IGBT).

6. The wind energy installation of claim 1, wherein each two-pole subsystem of the inverter comprises an energy-storage capacitor and two turn-off semiconductor switches which are electrically connected in series at a connecting point, with the series-connected semiconductor switches being electrically connected in parallel with the energy-storage capacitor, wherein the connecting point forms a first terminal of the two-pole subsystem and one pole of the energy-storage capacitor forms a second terminal of the two-pole subsystem.

7. The wind energy installation of claim 6, wherein the turn-off semiconductor switches comprise insulated gate bipolar transistors (IGBT).

8. The wind energy installation of claim 1, wherein the inverter and the transformer are located in the tower of the wind energy installation.

9. The wind energy installation of claim 1, wherein the inverter and the transformer are located in the pod of the wind energy installation.

10. A wind farm comprising at least two wind energy installations, with each wind energy installation having
a rotor,
a generator operatively connected to the rotor,
a converter electrically connected on an AC voltage side to the generator, and
the wind farm further comprising an inverter station having a free-running inverter electrically connected on a DC voltage side to a DC voltage side of the converters of the at least two wind energy installations by means of a direct-current cable in absence of a capacitor or inductor connected in the DC cable between the DC voltage side of the converter and the DC voltage side of the inverter, and on an AC voltage side to a transformer, the free-running inverter of the inverter station having phase modules, with each phase module having an upper and a lower valve branch, and with each valve branch having at least two two-pole subsystems electrically connected in series.

11. The wind farm of claim 10, wherein each converter comprising a diode rectifier.

12. The wind farm of claim 10, wherein each converter of each wind energy installation comprises phase modules, with each phase module having an upper and a lower valve branch, and with each valve branch having at least two two-pole subsystems electrically connected in series.

13. The wind farm of claim 10, wherein each two-pole subsystem of the inverter comprises an energy-storage capacitor and two turn-off semiconductor switches which are electrically connected in series at a connecting point, with the series-connected semiconductor switches being electrically connected in parallel with the energy-storage capacitor, wherein the connecting point forms a first terminal of the two-pole subsystem and one pole of the energy-storage capacitor forms a second terminal of the two-pole subsystem.

14. The wind farm of claim 13, wherein the turn-off semiconductor switches comprise insulated gate bipolar transistors (IGBT).

15. The wind farm of claim 10, wherein in each of the at least two wind energy installations, the generator and the converter are arranged in a pod of the corresponding wind energy installation.

16. The wind farm of claim 10, wherein in each of the at least two wind energy installations, the generator is arranged in a pod of the corresponding wind energy installation and the converter is arranged in a tower of that wind energy installation.

* * * * *